United States Patent [19]

Hirano et al.

[11] Patent Number: 5,090,235
[45] Date of Patent: Feb. 25, 1992

[54] HIGH ACCURACY WHEEL EXAMINING METHOD AND APPARATUS

[75] Inventors: Akira Hirano, Moroyama; Masashi Kuzunuki, Kawagoe, both of Japan

[73] Assignee: Honda Giken Kogyo Kabushiki Kaisha, Tokyo, Japan

[21] Appl. No.: 653,607

[22] Filed: Feb. 11, 1991

[30] Foreign Application Priority Data

Feb. 13, 1990 [JP] Japan .................................. 2-29698

[51] Int. Cl.⁵ .......................................... G01M 19/00
[52] U.S. Cl. ..................................... 73/117; 33/203.13
[58] Field of Search ......................... 73/117, 123, 126; 33/203.12, 203.13

[56] References Cited

U.S. PATENT DOCUMENTS 4,430,802  2/1984  Cole ............................... 33/203.12
4,901,560  2/1990  Hirano et al. ........................ 73/117

Primary Examiner—Jerry W. Myracle
Attorney, Agent, or Firm—Skjerven, Morrill, MacPherson, Franklin & Friel

[57] ABSTRACT

A method and apparatus for examining a wheel of a vehicle is provided. A support roller assembly for supporting thereon the wheel rotatably is provided to be movable translationally as well as rotationally in a plane when unlocked. A cylinder actuator having a reciprocating movable rod is also provided. A wire is extended between the tip end of the rod and the support roller assembly. When the rod is located at its advanced position, the wire is slackened to establish a static examination mode of operation, in which the support roller assembly can move freely in a plane without constraints. Under this condition, the static characteristic of the wheel is measured and adjusted, if necessary. On the other hand, when the rod is located at its retracted position, the wire is under tension, and the cylinder actuator is operatively coupled to the support roller assembly whose movement is under constraints through the wire. Thus, a dynamic examination mode of operation is established. Under this condition, the wheel is set in rotation and the dynamic characteristic of the wheel is measured and adjusted, if necessary.

9 Claims, 5 Drawing Sheets

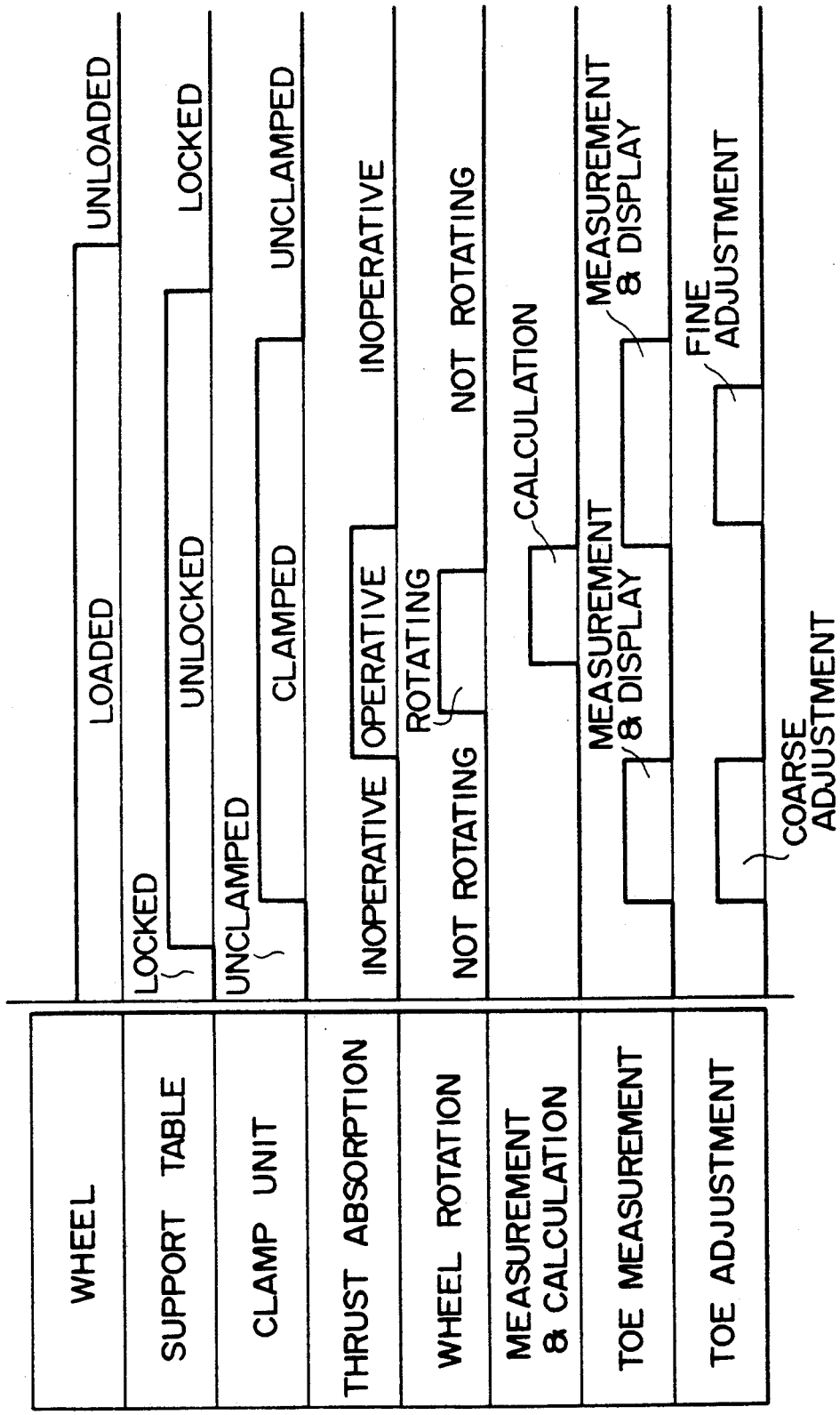

HIGH ACCURACY WHEEL EXAMINING METHOD AND APPARATUS

BACKGROUND OF THE INVENTION

1. Field of the Invention

This invention generally relates to a method and apparatus for examining the static characteristic, such as an inclination angle, and the dynamic characteristic, such as wobble and steering angle, of a wheel of a vehicle, such as an automobile, and, in particular, to a high accuracy wheel examining method and apparatus capable of carrying out static measurements, in which measurements are taken with a wheel in a non-rotating condition, and dynamic measurements, in which measurements are taken with a wheel in a rotating condition.

2. Description of the Prior Art

An apparatus for examining the mounting condition and/or alignment of a wheel of an automobile or the like is well known. A wheel attached to a vehicle, such as an automobile, is set with various conditions, including the so-called inclination angles, such as a toe angle, a camber angle and a caster, as the static characteristics of a wheel. These inclination angles are checked before a vehicle after having been manufactured is shipped and also after a maintenance or repair service operation involving replacement of wheels has been conducted. In order for a vehicle to have an excellent running performance, it is important that the inclination of a wheel be accurately set. In addition, the dynamic characteristic of a wheel, i.e., the characteristic of a wheel in rotation, includes wobbling of a wheel to the left and to the right and the angle of a wheel steered, and the running performance of a vehicle is significantly influenced by such a dynamic characteristic, so that it is important that such a dynamic characteristic can be measured at high accuracy.

A prior art wheel examining apparatus capable of measuring the dynamic characteristic of a wheel of a vehicle by having the wheel supported on a pair of support rollers and clamping both sides of the wheel with clamp rollers is described in the Japanese Patent Laid-open Pub. No. 63-286744, which corresponds to the U.S. Pat. No. 4,901,560, issued Feb. 20, 1990 to Hirano et al., which is hereby incorporated by reference. One of the co-inventors of the invention of this application is also one of the co-inventors of the above-identified U.S. patent. In the wheel examining apparatus disclosed in the above-identified U.S. patent, a support roller assembly 30 including a pair of support rollers is provided to be movable in a plane translationally as well as rotationally, and a rotating object thrust absorbing mechanism is incorporated in the support roller assembly 30. That is, as illustrated in FIG. 1 of the above-identified U.S. patent, in particular its FIGS. 13 and 14, the support roller assembly 30 has a frame 32 which is formed with a first engaging means 32a, and positioning means 34a-34b, which is fixedly provided exteriorly, is provided with a second engaging means 33 which can be engaged with and disengaged from the first engaging means 32a. And, when the first engaging means 32a and the second engaging means 33 are brought into engagement, the support roller assembly 30 pivots around a pivotal point defined by the engagement between the first and second engaging means 32a and 33, thereby absorbing the thrust applied by the wheel 1 in rotation.

As also shown in FIG. 1 of the above-identified U.S. patent, the support roller assembly 30 is rotatably mounted on a floating support table 20, and since the floating support table 20 is provided to be movable translationally in a plane by means of LM (linear motion) guides including rails extending in the longitudinal and transverse directions, the support roller assembly 30 can execute not only a translational motion, but also a rotational motion in a plane. As a result, the support roller assembly 30 can execute any two-dimensional motion in a plane freely. Accordingly, when both sides of a wheel 1 supported on the support rollers 31 are clamped by clamp rollers 47, the center of wheel 1 becomes aligned with the geometrical center of a clamping device including clamp rollers 47. In this case, if the support roller assembly 30 is unstrained in motion, the center of wheel 1 is brought into alignment with the geometrical center of the clamping device accurately irrespective of the fact that wheel 1 is located at the center of support rollers 31 or at any location slightly shifted therefrom.

However, in the apparatus shown in the above-identified U.S. patent, if wheel 1 is located on support rollers 31 at a location relatively away from the center thereof when wheel 1 placed on support roller assembly 30 has been clamped by clamp rollers 47 on both sides, first engaging means 32a may not be in alignment with second engaging means 33 any more. Thus, when second engaging means 33 is moved forwardly to bring it into engagement with first engaging means 32a before setting wheel 1 in rotation, second engaging means 33 may fail to be brought into engagement with first engaging means 32a because of such a positional misalignment. Therefore, in this wheel examining apparatus, while floating support table 20 on which support roller assembly 30 is mounted resides in its initial home location prior to setting the floating support table in an unstrained condition, it is necessary to move second engaging means 33 in the forward direction to have it brought into engagement with first engaging means 32a of support roller assembly 30.

In the wheel examining apparatus described in the above-identified U.S. patent, as shown in FIG. 1 of the present application, when placing wheel 1 to be examined on support roller assembly 30, since floating support table 20 and thus support roller assembly 30 is locked at its predetermined initial location, it is necessary to move second engaging means 33 in the forward direction to be brought into engagement with first engaging means 32a of support roller assembly 30 while floating support table 20 is in its locked condition. Thereafter, wheel 1 is clamped by roller clamps 47 from both sides to thereby effect positioning of the center of wheel 1. In this case, since floating support table 20 and thus support roller assembly 30 is partly restrained in movement due to engagement between first and second engaging means 32a and 33, it cannot be said that floating support table 20 is in a complete floating condition. Therefore, with the above-described structure, positioning of the center of wheel 1 is not entirely satisfactory in terms of reliability and accuracy.

Furthermore, in the wheel examining apparatus disclosed in the above-identified U.S. patent, as shown in FIG. 1 of the present application, wheel 1 is placed on support roller assembly 30 with support roller assembly 30 and thus floating support table 20 locked, and then first and second engaging means 32a and 33 are brought into engagement to establish a thrust absorbing mechanism, thereby setting up a condition in which a thrust absorbing operation can be carried out. Then, support roller assembly 30 and thus floating support table 20 is unlocked and thus set in an unstrained condition. Then, clamp rollers 47 are activated to clamp wheel 1 from both sides. Then, wheel 1 is set in rotation to take measurements which are then processed according to a predetermined program. The resulting toe angle value is displayed and alignment adjustments are effected, if necessary.

In this instance, the toe angle of a wheel is determined such that a longitudinal reference center line of a vehicle is first determined based on the center of each of a plurality (typically four) of wheels of a vehicle which is determined by clamping the wheel with clamp rollers from both sides and the toe angle of each of the wheels is determined as an angle formed between the longitudinal reference center line and the direction or center line of the wheel. And, if the measured toe angle of a wheel differs from a desired value, the alignment of the wheel is adjusted. In this case, however, when the wheel is adjusted in alignment, the location of the center of the wheel shifts, so that the longitudinal reference center line of a vehicle also shifts. That is, as shown in FIGS. 2 and 3, a wheel 1 is typically set with various parameters, including a king pin offset and a caster trail. It is also common that the wheel 1 is set with a predetermined camber. Under the condition, i the wheel is adjusted depending on measured values, the location of the center of a wheel shifts as shown in FIG. 4, so that the new location of the center of a wheel would not be the same as that before adjustments. Such a deviation would cause an error in toe angle measurements. In addition, the movement of a wheel during such adjustments is, in fact, a very complicated three-dimensional movement, so that detector rollers in contact with both sides of the wheel cannot follow the movement of the wheel accurately, which would cause discrepancy in contact point between the wheel and the detector rollers, which, in turn, also contribute to shift the location of the center of the wheel because the location of the center of a wheel is determined as the center location of the clamp rollers clamped on both sides of the wheel. Such a deviation would also cause an error in the measurement of a toe angle.

SUMMARY OF THE INVENTION

In accordance with one aspect of the present invention, there is provided a wheel examining method, including the steps of: placing a wheel to be examined on a wheel supporting means which is freely movable within a plane; measuring a static characteristic of said wheel with said wheel non-rotating; if a measured value of said static characteristic differs from a predetermined value, then carrying out an adjustment of said static characteristic; measuring a dynamic characteristic of said wheel with said wheel in rotation; and carrying out an adjustment of said dynamic characteristic, if necessary. In one embodiment of this aspect of the present invention, in a static measurement mode, the toe angle of each wheel is measured and a toe angle adjustment of each wheel is carried out, if necessary, and, then, a dynamic measurement mode is established, in which the wheel is set in rotation to measure an amount of its wobbling or the like, followed by adjustment of the dynamic characteristic, if necessary. In this manner, the examination of a wheel is divided into static and dynamic modes with coarse adjustments being carried out in the static mode and fine adjustments being carried out in the dynamic mode, and, thus, examination and adjustment of a wheel can be carried out at high accuracy.

In accordance with another aspect of the present invention, there is provided a wheel examining apparatus capable of examining a wheel at high accuracy. This wheel examining apparatus includes a support roller assembly which includes at least one support roller and thus supports a wheel rotatably. The support roller assembly is provided to be freely movable in a plane and can execute translational and rotational movements. The present apparatus also includes a clamp roller assembly provided with a plurality of clamp rollers which can clamp a wheel from both sides. The location of the center of the clamp roller assembly becomes aligned with the location of the center of a wheel in a vertical direction when the wheel is clamped by the clamp rollers from both sides. Thus, when clamped, the location of the center of the wheel thus clamped is vertically aligned with the location of the center of the clamp roller assembly. Such a support roller assembly and a roller clamp assembly may be constructed as described in the above-identified U.S. patent, and, alternatively, use may be made of any other desired structures.

The support roller assembly can be locked at its initial position, and when unlocked, it is set to be freely movable in a plane. For example, as described in the above-identified U.S. patent, the support roller assembly can be rotatably mounted on a floating support plate which in turn can be provided to be movable in any desired direction within a plane, for example, by LM guides or the like. A fixed point setting means, which is stationary relative to the support roller assembly, is provided, and the fixed point setting means is always interconnected to the support roller assembly through an interconnecting means. The interconnecting means extends between the support roller assembly and the fixed point setting means and it can be set either in a tension or tight condition or a slack condition selectively. For example, in the preferred embodiment, during the static measurement mode, the interconnecting means is set in its slack condition, whereas, it is set in its tight condition under tension during the dynamic measurement mode Therefore, with this structure, a mode change between the static and dynamic measurement modes can be effected simply by setting the interconnecting means in its slack condition or tight condition selectively. Such a structure allows to make a wheel examining apparatus extremely simpler in structure and to carry out an examining operation at high speed.

It is therefore a primary object of the present invention to provide an improved wheel examining method and apparatus capable of examining a predetermined characteristic of a wheel at high accuracy.

Another object of the present invention is to provide an improved wheel examining method and apparatus capable of carrying out a wheel examination operation with ease and at high speed.

A further object of the present invention is to provide an improved wheel examining method and apparatus simple in structure, easy to manufacture and low at cost.

Other objects, advantages and novel features of the present invention will become apparent from the following detailed description of the invention when considered in conjunction with the accompanying drawings.

BRIEF DESCRIPTION OF THE DRAWINGS

FIG. 8 is a timing diagram showing a sequence of steps of a wheel examining method constructed in accordance with one embodiment of the present invention using a wheel examining apparatus incorporating the thrust absorbing device shown in FIGS. 7 and 8.

DESCRIPTION OF THE PREFERRED EMBODIMENTS

Figure 5:
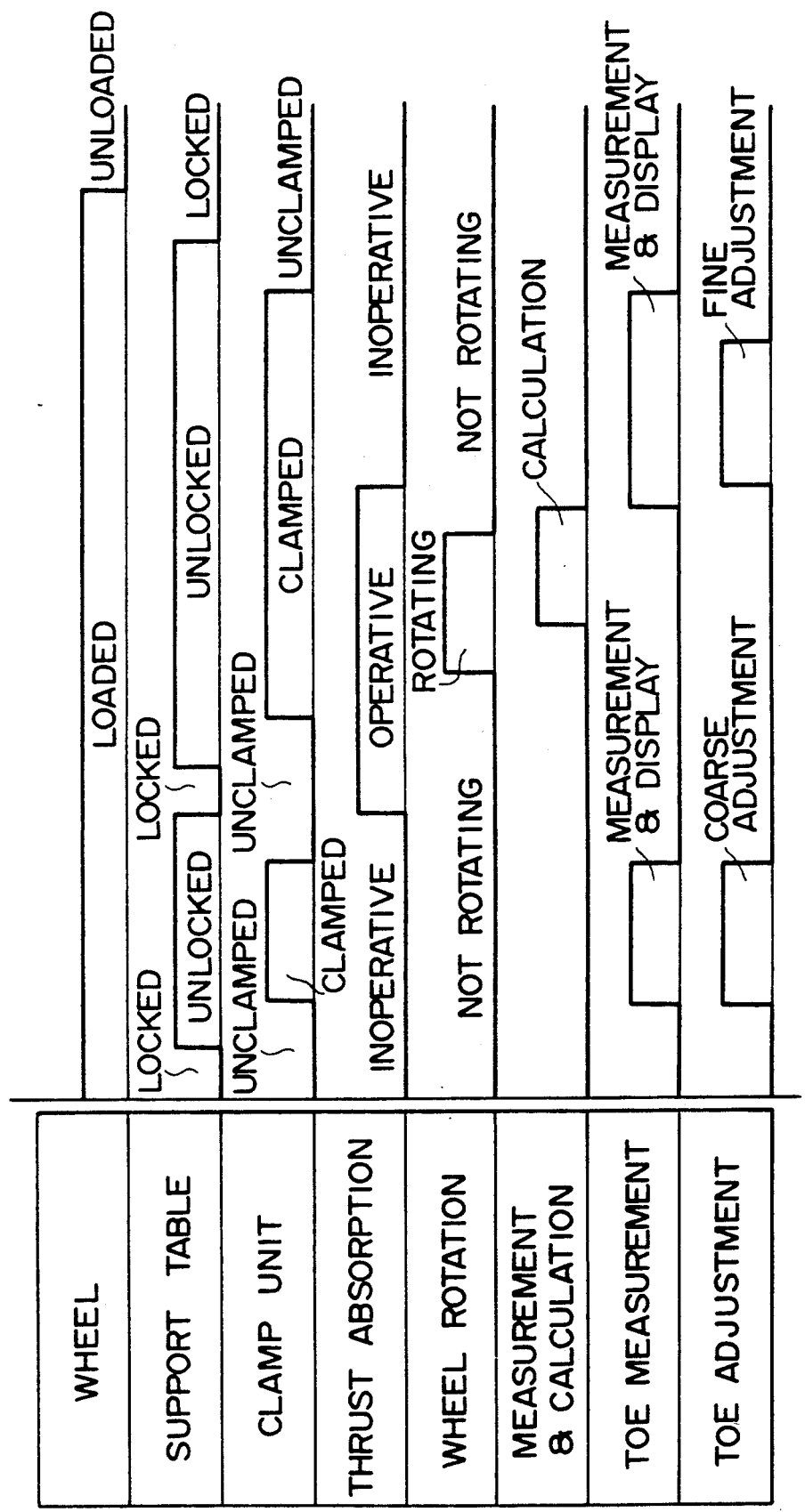
FIG. 5 is a timing diagram showing a sequence of steps of a wheel examining method constructed in accordance with one embodiment of the present invention which allows to improve the accuracy of measurement using the wheel examining apparatus described in the U.S. Pat. No. 4,901,560.

Referring to FIG. 5, there is schematically shown in timing diagram a sequence of steps of a wheel examining method in accordance with one embodiment of the present invention. This wheel examination method can be carried out using the wheel examining apparatus described in the U.S. Pat. No. 4,901,560, and, thus, reference numbers of elements in this section of description correspond to reference numbers of elements in the above-identified U.S. patent.

The present wheel examining method basically has a two-step structure, including a static mode in the first half and a dynamic mode in the latter half. In making measurement, in the static mode, a wheel 1 supported on a support roller assembly 30 is held in a non-rotating condition, whereas, in the dynamic mode, the wheel 1 is set in rotation. Preferably, coarse adjustments of wheel 1 are carried out during the static mode, and, then, fine adjustments are effected to the wheel 1 during the dynamic mode. The wheel 1 can be examined at extremely high accuracy by diving the wheel examining operation into two modes in this manner.

Figure 1:
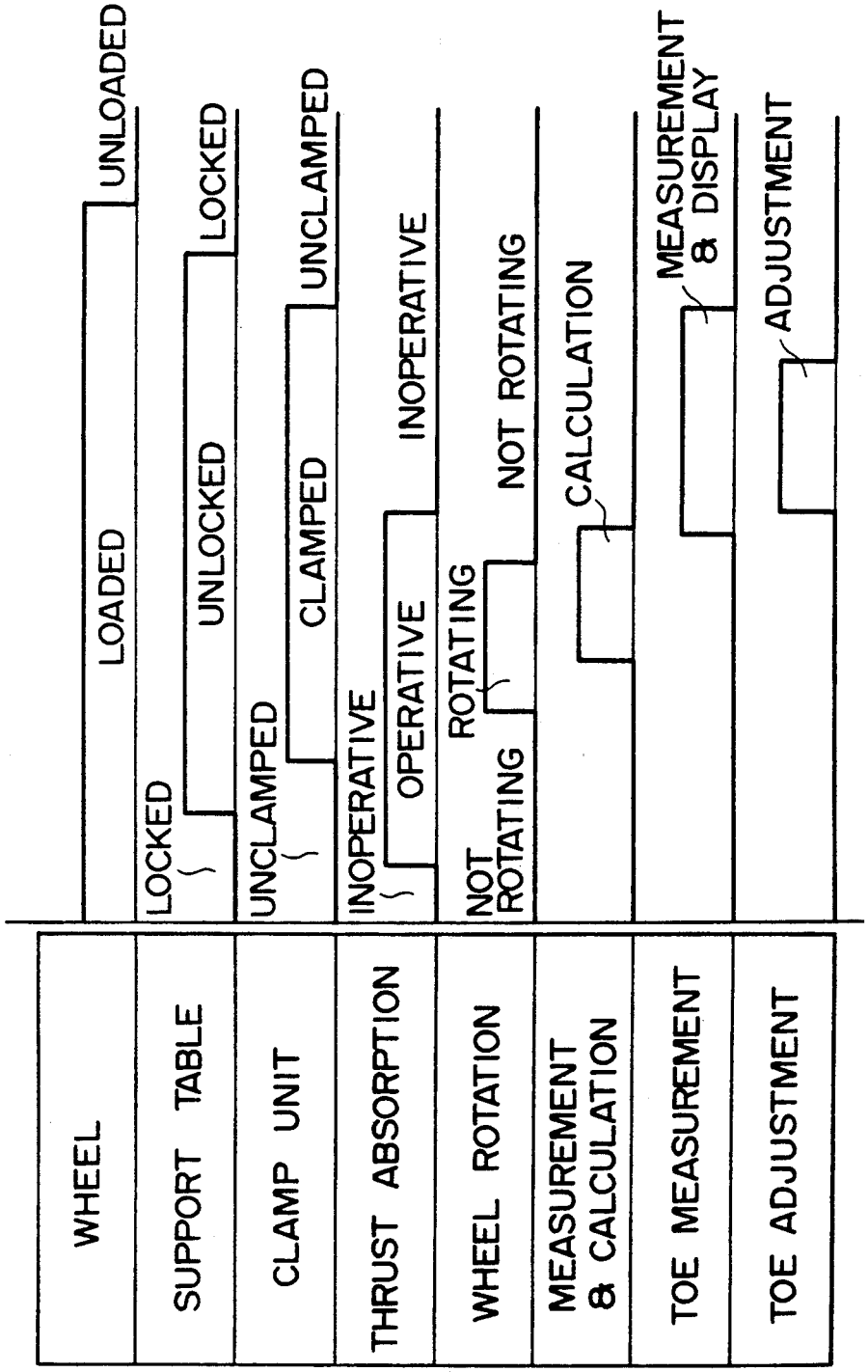
FIG. 1 is a timing diagram showing a typical sequence of steps of a wheel examining operation when use is made of a wheel examining apparatus described in the U.S. Pat. No. 4,901,560.
Figure 2:
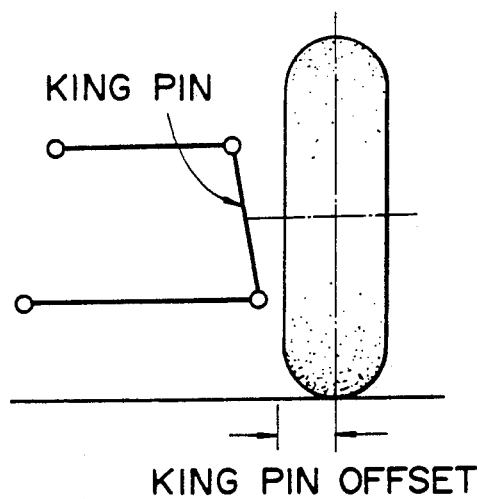
FIGS. 2 through 4 are schematic illustrations showing how the geometrical center of a wheel shifts when various parameters, such as inclination angle, set in the wheel are varied by adjusting the orientation of the wheel.
Figure 3:
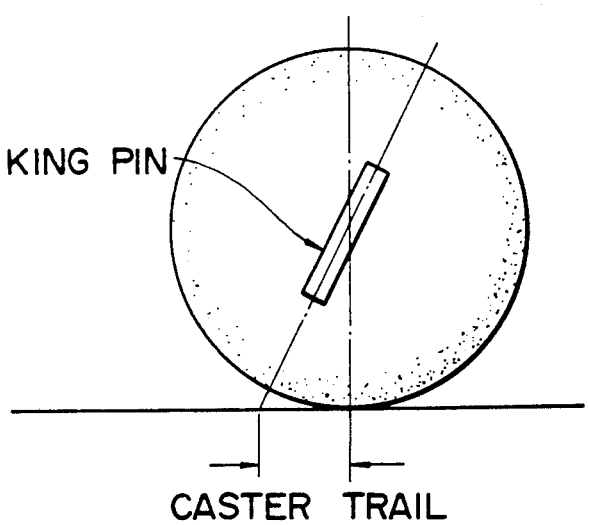
Figure 4:
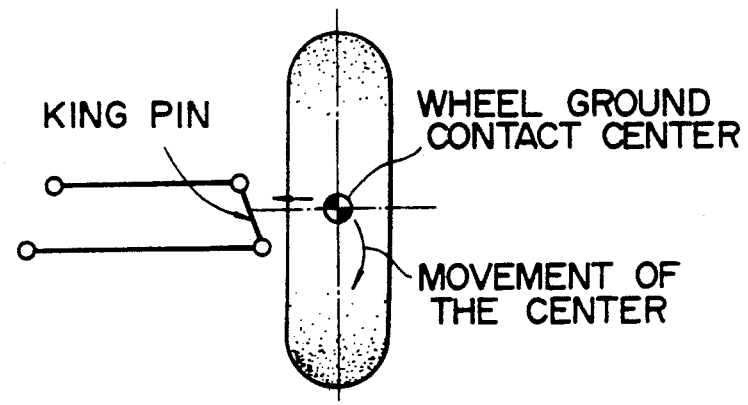

Now, referring to FIG. 5, the wheel examining method of this invention will be described in detail. In the first place, with the support roller assembly 30 locked at its initial position, a wheel 1 to be examined is placed on the support roller assembly 30. Then, the floating support table 20 is unlocked to thereby release the locked condition of the support roller assembly 30. As a result, the support roller assembly 30 is set to be freely movable in a plane. It is to be noted that in the prior art method shown in FIG. 1, the first and second engaging means are first brought into engagement and then the floating support table 20 and thus the support roller assembly 30 are unlocked. In the present embodiment under the condition, the support roller assembly 30 is not in engagement with any pivotal point and is set in a completely unconstrained condition. Then, the clamp rollers 47 are activated to clamp the wheel 1 from both sides. With the wheel 1 clamped, a desired inclination angle, such as a toe angle, of the wheel 1 is measured, and, if necessary, the orientation of the wheel 1 is adjusted (coarse adjustment), thereby completing the static mode of examination operation. During this static mode, the wheel 1 is maintained in a non-rotating condition.

Then, the mode of operation is changed from the static mode to the dynamic mode. That is, the clamp rollers 47 are removed from both sides of the wheel 1 to set the wheel 1 in an unclamped condition. Then, the floating support table and thus the support roller assembly 30 are locked to have the support roller assembly 30 returned to its initial position. The reason why the support roller assembly 30 is required to return to its initial position by having it locked resides in the fact that, in the structure of the wheel examining apparatus described in the above-identified U.S. patent, the first and second engaging means 32a and 33 are disengageable and they may often times not be in alignment due to changes in orientation of the support roller assembly 30 caused by the operation during the static mode. With the support roller assembly 30 locked in the dynamic mode, the second engaging means 33 is caused to move in the forward direction to be brought into engagement with the first engaging means 32a to establish a thrust absorption operation condition. Then, the support roller assembly 30 is unlocked and thereafter the clamp rollers 47 are activated to clamp the wheel 1 again from both sides. With the wheel 1 clamped again, the wheel 1 is set in rotation and measurements are taken and processed in accordance with a predetermined program. Based on the resulting values, if necessary, the orientation of the wheel 1 is again adjusted. The adjustment in this case is a fine adjustment. Prior to this fine adjustment, the first and second engaging means 32a and 33 must be disengaged from each other. Upon completion of fine adjustment, the clamp rollers 47 are removed from the wheel 1, the support roller assembly 30 is locked to its initial position and the wheel 1 is removed from the support roller assembly 30.

In accordance with the above-described method, a wheel of a vehicle can be examined at high accuracy; however, since the support roller assembly 30 must be locked so as to have it returned to its initial position during the transition from the static mode to the dynamic mode, an extra operational step is required, which is disadvantageous because the overall operational time period is increased. Under the circumstances, it is desired to have a structure which allows to carry out a direct conversion from the static mode to the dynamic mode. In accordance with another embodiment of the present invention, there is provided a wheel examining apparatus having a structure which allows such a direct conversion from the static mode to the dynamic mode without returning the support roller assembly once to its initial position Referring now to FIGS. 6 and 7, there is shown a thrust absorbing device constructed in accordance with one embodiment of the present invention, which can be advantageously incorporated into the wheel examining apparatus described in the above-identified U.S. patent to obtain an improved wheel examining apparatus having a desired performance. In the following, it will be described as to the structure in which the thrust absorbing device shown in FIGS. 6 and 7 is applied to the wheel examining apparatus described in the above-identified U.S. patent; however, it is also to be noted that the thrust absorbing apparatus can also be used to any other wheel examining apparatus.

Figure 6:
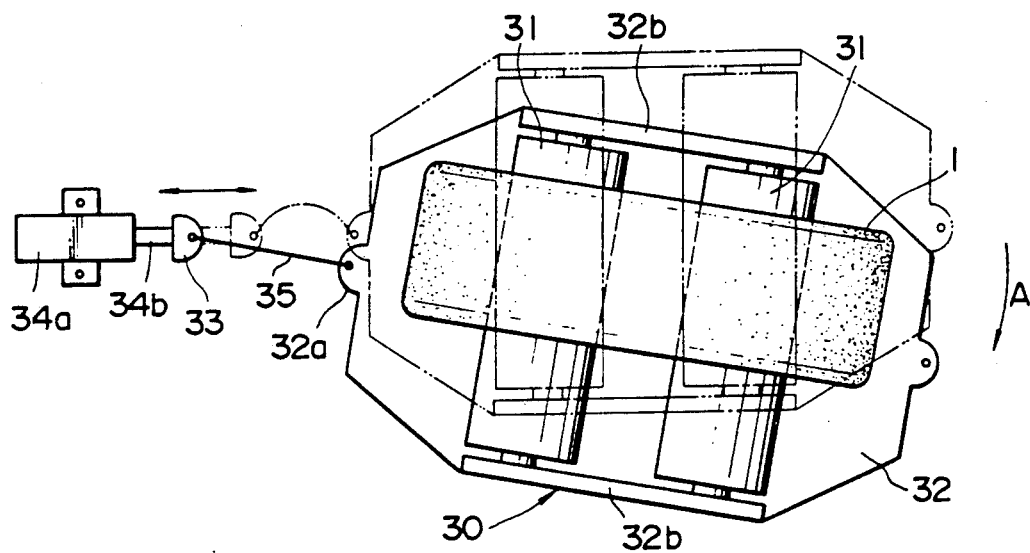
FIGS. 6 and 7 are schematic illustrations showing a thrust absorbing device constructed in accordance with one embodiment of the present invention and applicable to the wheel examining apparatus described in the U.S. Pat. No. 4,901,560.
Figure 7:
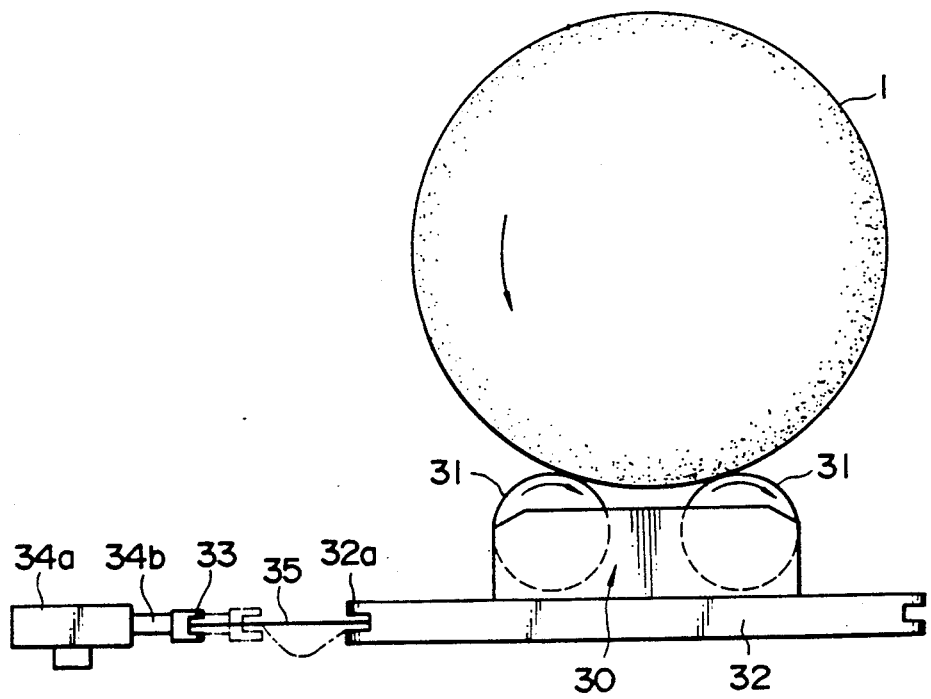

A wheel examining apparatus according to one embodiment of the present invention can be obtained by replacing the thrust absorbing device shown in FIGS. 13 and 14 of the wheel examining apparatus described in the above-identified U.S. patent with the thrust absorbing device shown in FIGS. 6 and 7 of the present application. Thus, for the sake of convenience, identical elements are indicated by identical reference numbers between FIGS. 13 and 14 of the above-identified U.S. patent and FIGS. 6 and 7 of the present application.

In the first place, a description will be had with respect to the thrust absorbing device shown in FIGS. 6 and 7. As shown in FIGS. 6 and 7, a support roller assembly 30 has a generally U-shaped cross sectional shape in its transverse direction and includes a flat bottom wall 32 and a pair of side walls 32b extending upright from opposite sides of the bottom wall 32. A pair of support rollers 31 is arranged in parallel and rotatably supported between the pair of side walls 32b, and these support rollers 31 can support a wheel 1 thereon. A pair of engagement holes 32a is provided at the front and rear ends of the bottom wall 32. In addition, a cylinder actuator 34a is fixedly mounted on a predetermined position, such as a main frame of the wheel examining apparatus, and, thus, the cylinder actuator 34a is stationary relative to the movable support roller assembly 30. The cylinder actuator 34a includes a rod 34b which can be pushed outward or retracted. A first engaging portion 33 is formed at the front end of the rod 34b. One end of an interconnecting member 35, such as wire, is coupled to the first engaging portion 33, and a point of coupling between the first engaging portion 33 and the interconnecting member 35 defines a fixed point for the support roller assembly 30 when the interconnecting member 35 is set in its tight or tension condition by setting the rod 34 at its retracted position. Thus, the cylinder actuator 34a, the rod 34b and the first engaging portion 33, together, define a fixed point setting means of the present embodiment.

On the other hand, the other end of the interconnecting member 35 is coupled to a second engaging portion 32a formed at the front end of the bottom wall 32. Another second engaging portion 32a is formed at the rear end of the bottom wall 32, so that this second engaging portion at the rear end of the bottom wall 32 may be interconnected to another fixed point setting means through another interconnecting member, if desired. Therefore, even if the fixed point setting means is always interconnected to the support roller assembly 30 through the interconnecting member 35, the support roller assembly 30 can be substantially set in its constrained condition or unconstrained condition depending on whether the interconnecting member 35 is set in its tight condition under tension or its slack condition. In the embodiment shown in FIGS. 6 and 7, the rod 34b can take either an advanced position indicated by the dotted lines or a retracted position indicated by the solid lines. When the rod 34b is located at its advanced position, the interconnecting member 35 is set in its slack condition, whereas, when the rod 34b is located at its retracted position, the interconnecting member 35 is set in its tight condition. When the interconnecting member 35 is set in its tight condition, the support roller assembly 30 is substantially operatively coupled to the fixed point setting means through the interconnecting member 35, so that the support roller assembly 30 is set movable within a maximum limit defined by the length of the interconnecting member 35 and a fixed point corresponding to a point of connection between the first engaging portion 33 and the interconnecting member 35. On the other hand, when the interconnecting member 35 is set in its slack condition, an operative coupling between the support roller assembly 30 and the fixed point setting means is substantially released even if the support roller assembly 30 remains interconnected to the fixed point setting means through the interconnecting member 35 since the interconnecting member 35 is slackened. As a result, under this condition, the limit of movement is basically removed and the support roller assembly 30 is set movable in any direction within a plane.

The support roller assembly 30 is supported to be freely movable in a plane, and, for example, when applied to the wheel examining apparatus described in the above-identified U.S. patent, the support roller assembly 30 is supported rotatably on the floating support table 20 which in turn is supported to be movable in a plane translationally by means of LM guides. However, it should be noted that the support roller assembly 30 can be supported movably within a plane by any other appropriate method.

In operation, in the first place, with the support roller assembly 30 locked at its initial position indicated by the dotted lines in FIG. 6, a wheel 1 to be examined is placed on the support rollers 31. The rod 34b is located at its advanced position and thus the interconnecting member 35 is set in its slack condition. In this case, since an inclination angle, such as a toe angle, is set in the wheel 1, the direction of the rotating axis of the wheel 1, which is indicated by the solid lines in FIG. 6, placed on the support rollers 31 normally does not agree with the direction of the rotating axis of the support rollers 31, so that the wheel 1 is typically aslant with respect to the support rollers 31. Then, the support roller assembly 30 is unlocked to thereby make the support roller assembly 30 movable freely within a plane. Then, the wheel 1 is clamped from both sides by clamp rollers (not shown) as described in the above-identified U.S. patent. Therefore, the center of the wheel 1 is aligned with the center of the clamp roller assembly, and, thus, positioning of the wheel 1 is completed.

Then, the rod 34b is moved to its retracted position. In this case, the interconnecting member 35 is set in its tight condition and the support roller assembly 30 is operatively coupled to the fixed point setting means. Then, when the wheel 1 is set in rotation, forces, such as thrust, are produced between the wheel 1 and the support roller assembly 30, so that the support roller assembly 30 moves generally in the direction indicated by an arrow A in FIG. 6 with a point of connection between the first engaging portion 33 and the interconnecting member 35 as a fixed point. In general, when the support roller assembly 30 has reached a position where the rotating axes of the support rollers 31 are substantially in parallel with the rotating axis of the wheel 1, i.e., the position of the support roller assembly 30 indicated by the solid lines in FIG. 6, the forces acting between the wheel 1 and the support rollers 31 are balanced, so that the support roller assembly 30 ceases its movement and is maintained at its equilibrium. In the case where the direction of the support roller assembly 30 under the condition can be regarded to be in agreement with the toe angle of the wheel 1, the toe angle of the wheel 1 can be measured by measuring the orientation of the support roller assembly 30 under the condition. In addition, since the wheel 1 is in rotation, the amount of wobble of the wheel 1 to the left and to the right can be measured dynamically.

When positioning of the geometrical center of the wheel 1 is to be carried out with the wheel 1 clamped on both sides or adjustments are made to the orientation of the wheel 1, the support roller assembly 30 should be set freely movable in a plane, i.e., being unconstrained in both of translational and rotational movements in a plane. In accordance with the present embodiment, since the interconnecting member 35 is set in its slack condition simply by locating the rod 34b at its advanced position, the support roller assembly 30 is set in its substantially unconstrained condition.

In the above-described embodiment of the present invention, use has been made of a piece of wire as the interconnecting member 35; however, the interconnecting member 35 should not be limited only to wire, use may be made of any other alternative materials as long as they can establish a substantially coupled condition when an interconnection is required and a substantially decoupled condition when a disconnection is required. For example, various chains, such as snake chains, can be used, and various elastic materials, such as rubber, can also be used. In addition, in the above-described embodiment, use has been made of a cylinder actuator as the fixed point setting means, but use may be made of any other appropriate devices than cylinder actuators. For example, use made also be made of a winding and unwinding device, such as a winch, and, alternatively, use may also be made of a structure including a reel or the like which can wind and unwind an interconnecting member. Further, even in the case in which use is made of a cylinder actuator, its rod can also be used as the interconnecting member itself. In this case, it should be so structured that the tip end of the rod is directly and normally connected to the support roller assembly 30 and the rod should be set to be freely movable forwardly or backwardly while the cylinder actuator is held inoperative, thereby causing the support roller assembly 30 to be in its unconstrained condition; on the other hand, when the rod is moved to its retracted position, the rod should be held immovably to thereby set the support roller assembly 30 in its constrained condition. In this case, instead of coupling the tip end of the rod directly to the support roller assembly 30, such a connection can also be made through any desired link mechanism. In this instance, such a link mechanism serves as the interconnecting member 35.

Next, referring to FIG. 8, a wheel examining method in accordance with the present invention using a wheel examining apparatus incorporating the thrust absorbing device shown in FIGS. 6 and 7 will be described below. In the first place, it is assumed that the support roller assembly 30 is locked at its initial home position, i.e., at the position indicated by the dotted lines in FIG. 6. Under this condition, a wheel 1 is placed on the support rollers 31 as indicated by the dotted lines in FIG. 6. For example, the wheel 1 may be placed on the support rollers 31 by driving a vehicle to which the wheel 1 is attached. In this instance, as described previously, the rotating axis of the wheel 1 is normally not in parallel with the rotating axis of each of the support rollers 31. Then, the locked state of the floating support table is released. Since the support roller assembly 30 is mounted rotatably on the floating support table which in turn is translationally movable in a plane and the locked state of the support roller assembly 30 is released, the support roller assembly 30 is set to be freely movable in a plane translationally as well as rotationally.

Then, clamp rollers, which also serve as detector rollers, are brought into contact with both sides of the wheel 1 to have the wheel 1 clamped from both sides. Because of this, the geometrical center of the wheel 1 is aligned with a predetermined center of the clamp roller assembly vertically, thereby completing a positioning operation of the wheel 1. Thus, there is established a static examination mode. Using the clamp rollers and/or any other detectors, parameters of the wheel 1 are statically measured, and the measured results are displayed. If the measured results differ from expected values, then adjustments are applied to the static characteristic of the wheel 1. This corresponds to the so-called coarse adjustment in the present invention. It is to be noted at this juncture that, in this embodiment of the present invention, since the thrust absorbing device is still in its released state and thus the interconnecting member 35 is in its slack condition, the support roller assembly 30 is in its unconstrained condition in movement, so that the static examination of the wheel 1 can be carried out at extremely high accuracy.

Upon completion of the static examination mode the rod 34b is moved to its retracted position to have the interconnecting member 35 set in its tight condition. Under this condition, the support roller assembly 30 becomes constrained in movement and the forward end portion of the rod 34b of the cylinder actuator as the fixed point setting means defines a fixed point. Thus, there is established a dynamic examination mode, in which the thrust absorbing operation for the support roller assembly 30 can be carried out and any other undesired unbalanced forces can also be absorbed. In this manner, in accordance with this embodiment of the present invention, the support roller assembly 30 can be set in its dynamic examination mode simply by setting the interconnecting member 35 in its tight condition without again locking the support roller assembly 30 to its initial position and setting the clamp rollers in its unclamped condition. Thus, the dynamic examination operation can be carried out expeditiously and at high accuracy.

Upon establishing the dynamic examination mode as described above, the wheel 1 is set in rotation to carry out dynamic measurements and the measured results are processed according to a predetermined program. The resulting processed values are displayed. If the resulting values do not agree with expected values, then adjustments are applied to the dynamic characteristic of the wheel 1. This adjustment corresponds to the so-called fine adjustment of the present invention. It should be noted that this dynamic examination mode is not limited to measurements and adjustments of the dynamic characteristic of the wheel 1, but it can also include adjustments of the static characteristic of the wheel 1. In other words, adjustments of the static characteristic of the wheel 1 can be carried out additionally based on the measurements taken during the dynamic examination mode. In this sense, the adjustments to be carried out in the dynamic examination mode are called the fine adjustments. Thus, the terms "coarse" and "fine" adjustments used herein should be interpreted in this sense. It should also be noted that, prior to effecting fine adjustments in this mode, the rod 34b is moved to its advanced position to have the interconnecting member 35 set in its slack condition, thereby causing the support roller assembly 30 to be set in its unconstrained condition in movement.

Upon completion of the dynamic examination mode, the clamp rollers are moved away from the wheel 1 to their initial locations and both of the floating support table and the support roller roller assembly 30 are returned to and locked at their initial positions. Then, the wheel 1 is moved away from the support rollers 31, for example, by driving the vehicle to which the wheel 1 is attached, and it is set ready to examine the wheel 1 of the next vehicle.

As described above, in accordance with this embodiment of the present invention, when converting the examination mode from the static mode to the dynamic mode, it is only necessary to set the interconnecting member 35 in its slack condition and it is not necessary to have the support roller assembly 30 returned to and locked at its initial position, so that operational steps are reduced and the examination operation can be carried out at reduced time. In addition, since the static and dynamic modes of operation are carried out in sequence, measurements and adjustments of a wheel, e.g., regarding alignment, can be carried out at extremely high accuracy.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for examining a wheel of a vehicle, comprising the steps of:
    placing a wheel of a vehicle on a wheel supporting means which is freely movable in a plane;
    measuring first predetermined parameters of said wheel with said wheel clamped from both sides and kept non-rotating;
    if measured values of said first predetermined parameters differ from first expected values, adjusting said wheel to eliminate such discrepancy; and
    measuring second predetermined parameters of said wheel with said wheel set in rotation around a rotating axis thereof.

2. The method of claim 1, further comprising the step of:
    if measured values of said second predetermined parameters differ from second expected values, adjusting said wheel to eliminate such discrepancy.

3. The method of claim 2, wherein said steps of measuring first predetermined parameters and measuring second predetermined parameters are carried out without releasing the clamped condition of said wheel.

4. Apparatus for examining a wheel of a vehicle, comprising:
    supporting means for supporting a wheel of a vehicle rotatably, said supporting means being capable of being set to be freely movable in a plane;
    clamping means for clamping said wheel supported on said supporting means from both sides;
    detecting means for detecting a predetermined characteristic of said wheel supported on said supporting means;
    setting means for setting a fixed point, said setting means being fixedly provided relative to said supporting means when said supporting means is set to be freely movable; and
    interconnecting means for interconnecting said supporting means and said setting means at all times.

5. Apparatus of claim 4, wherein said setting means includes a cylinder actuator having a reciprocatingly movable rod, whose tip end defines said fixed point and is operatively coupled to one end of said interconnecting means.

6. Apparatus of claim 4, wherein said interconnecting means includes a piece of wire.

7. Apparatus of claim 4, wherein said clamping means includes a plurality of clamp rollers, which can be brought into contact with both sides of said wheel to have said wheel clamped from both sides.

8. Apparatus of claim 4, wherein said supporting means includes at least one support roller for supporting said wheel rotatably.

9. Apparatus of claim 4, wherein said supporting means is provided to be movable translationally as well as rotationally in a plane.

* * * * *

UNITED STATES PATENT AND TRADEMARK OFFICE
CERTIFICATE OF CORRECTION

PATENT NO.    :   5,090,235
DATED         :   February 25, 1992
INVENTOR(S)   :   Akira Hirano and Masashi Kuzunuki It is certified that error appears in the above-identified patent and that said Letters Patent is hereby corrected as shown below:

Col. 7, line 13
    delete "had" and substitute --made--.

Col. 9, line 30
    delete "made" (first occurrence) and substitute --may--.

Col 11, line 7
    delete "roller" (first occurrence).

Signed and Sealed this

Fifteenth Day of March, 1994

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,090,235
DATED : February 25, 1992
INVENTOR(S) : Akira Hirano and Masashi Kuzunuki It is certified that error appears in the above-indentified patent and that said Letters Patent is hereby corrected as shown below:

On the title page: Item [73]   Assignee" add:
    --Anzen Motor Car Co., Ltd., Tokyo, Japan--.

Col. 7, line 13
    delete "had" and substitute --made--.

Col. 9, line 30
    delete "made" (first occurrence) and substitute --may--.

Col 11, line 7
    delete "roller" (first occurrence).

Signed and Sealed this

Fourth Day of April, 1995

Attest:

BRUCE LEHMAN

Attesting Officer    Commissioner of Patents and Trademarks